U̇nited States Patent [19]

Andrews

[11] 3,922,915

[45] Dec. 2, 1975

[54] LIQUID LEVEL INDICATOR

[76] Inventor: Ottie H. Andrews, 3129 Olinda Lane, Anaheim, Calif. 92804

[22] Filed: July 29, 1974

[21] Appl. No.: 492,439

[52] U.S. Cl. .................................. 73/302; 73/302
[51] Int. Cl.² ....................................... G01F 23/14
[58] Field of Search .......... 73/302, 304, 303, 290 R

[56] References Cited
UNITED STATES PATENTS

| | | | |
|---|---|---|---|
| 1,692,163 | 11/1928 | Farwal | 73/302 |
| 1,840,648 | 1/1932 | Wheeler | 73/302 |
| 1,840,748 | 1/1932 | Star | 73/302 |
| 1,964,253 | 6/1934 | Diemmer | 73/302 |
| 2,067,767 | 1/1937 | Kollsana | 73/302 |

Primary Examiner—Richard E. Aegerter
Assistant Examiner—A. Jason Mirabito
Attorney, Agent, or Firm—Francis X. LoJacono, Sr.

[57] ABSTRACT

An apparatus for indicating an accurate level of liquid disposed within a tank that is generally installed in a motor vehicle, the apparatus comprising a bell housing defining a pressure chamber for trapping a body of air in the liquid container, said housing having an opened lower end adapted to receive a regulating plug positioned adjacent the bottom of the tank, the plug including at least one orifice therein to allow free flow of air and liquid therethrough. A pressure-actuating means is interconnected to the pressure chamber by means of a conduit system having a charging means operably connected intermediate the bell housing and the pressure actuating means, whereby the chamber can be replenished with the proper amount of air pressure versus the liquid pressure, thereby providing an accurate indication of the contents of the tank.

9 Claims, 10 Drawing Figures

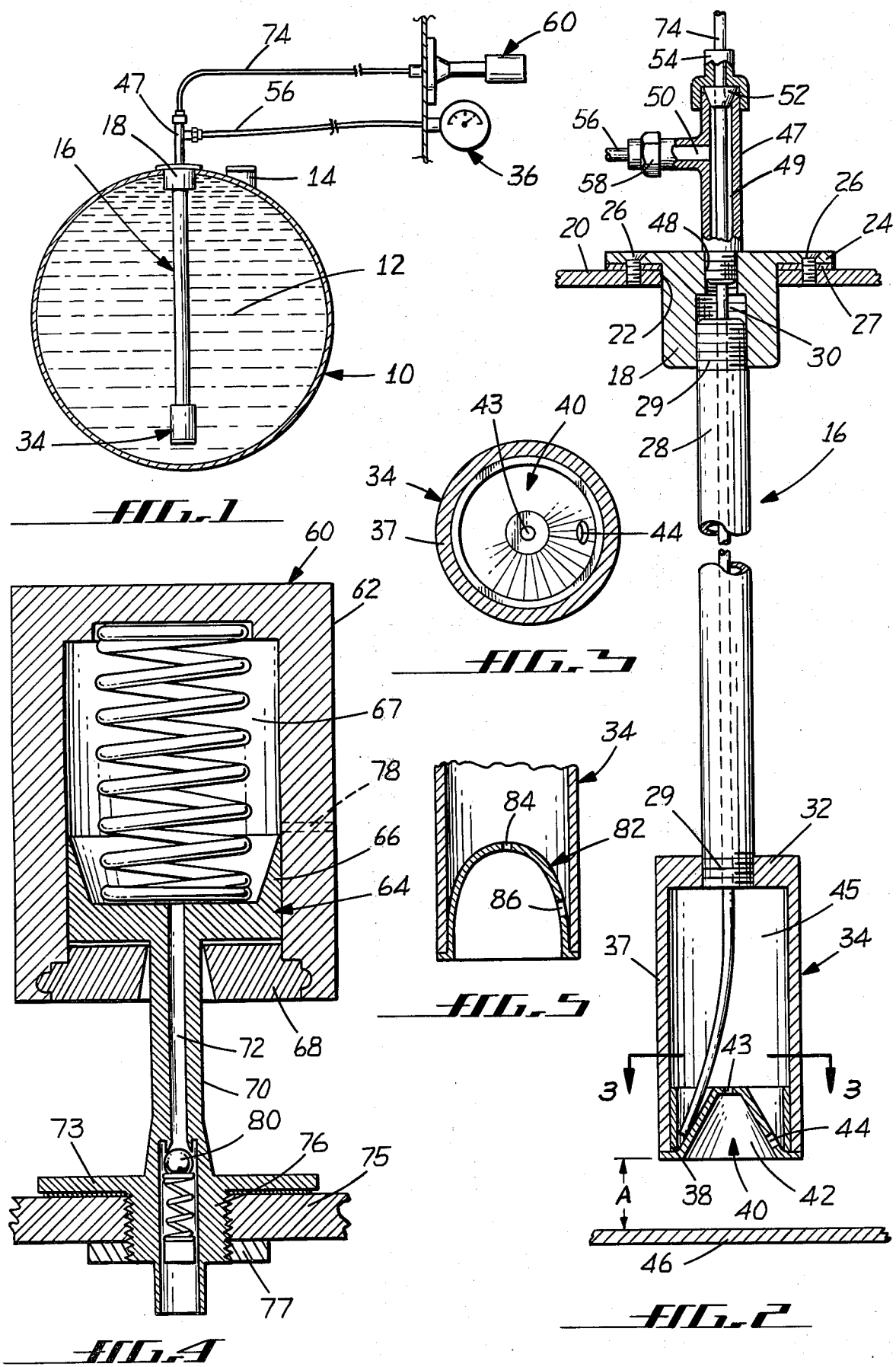

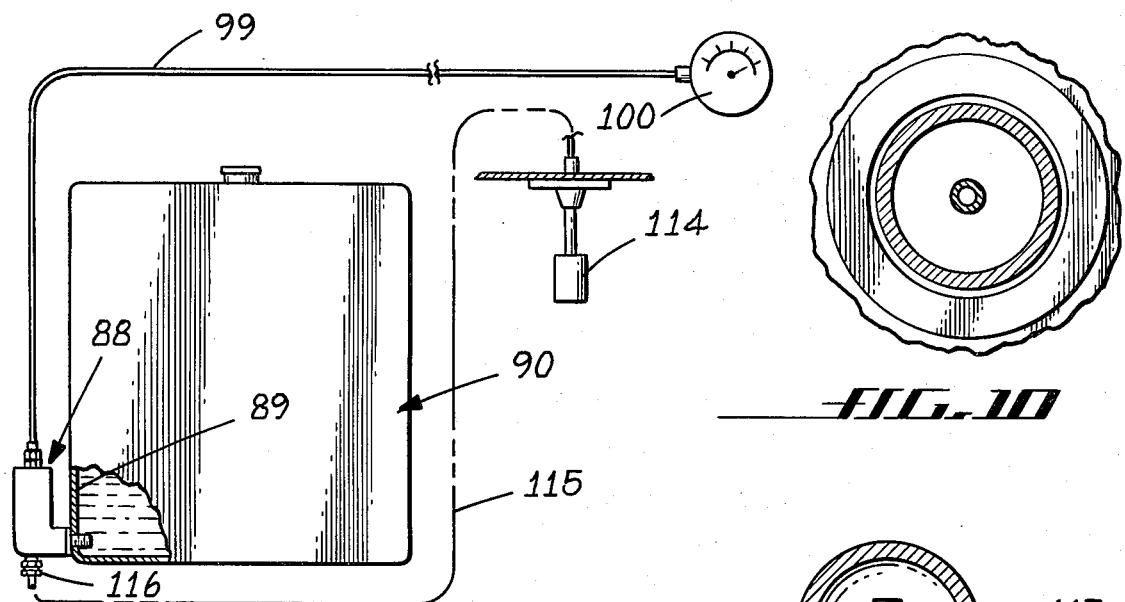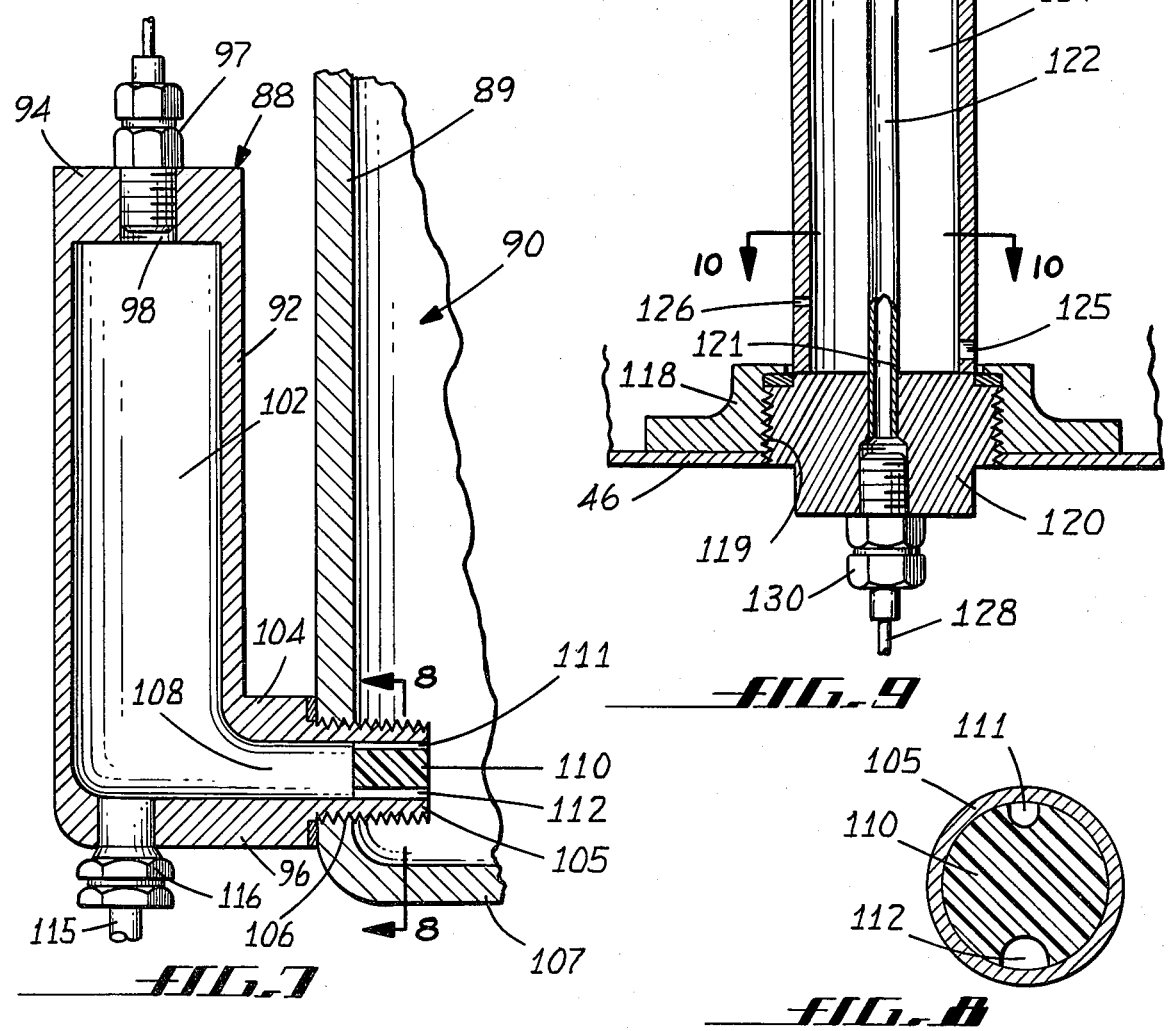

LIQUID LEVEL INDICATOR

BACKGROUND

This invention relates generally to a liquid level indicator which provides a constant measurement of the liquid content in a tank, or other type of container and more particularly to a liquid level indicator adapted for use in a fuel tank of a motor vehicle, such as a truck, etc., wherein the level of fuel stored therein can be accurately read within the cab of the truck without the aid of mechanical connections.

As is well known in the art, various types of measuring devices to indicate, at any given time, the amount of fuel stored in tanks have been and are presently available. However, numerous problems and difficulties are encountered with these devices in providing a constant and accurate reading of the liquid supply within said fuel tanks — particularly, those tanks adapted to hold very large amounts of fuel (at least fifty gallons or more), such as for long distance hauling by trucks.

Thus, it is imperative that a driver of a large trucking rig have a very accurate measuring device for his vehicle so that a long trip can be planned, with enough fuel at all time so that he does not find himself stranded in an isolated area. This could means the loss of perishable items, as well as the loss of time and money.

Level-indicating devices, particularly those comprising mechanical connections with rods, floats, springs, and other various moving parts, have not been found to be very reliable due to wear and tear, and abuse that such mechanical devices must endure in all types of road conditions.

However, there are some liquid level indicators that do not use mechanical devices but rely on pressure within their systems; however, these, too, have been found to be unreliable. To the applicant's knowledge, they do not provide a constant and accurate reading of the fluid level within a tank — because of the inherent change in ambient atmosphere, as well as the extreme abuse encountered by the constant movement of the liquid when the tank is low in fuel.

Accordingly, it has been found by many truck drivers that the average fuel-level indicator devices have inherent limitations that create poor operating performance and become expensive to operate; hence, they do not provide satisfactory aids in day-to-day road trips.

SUMMARY

The present invention solves the above problems; and thus provides a very simple, easy-to-operate and accurate liquid-level indicating device heretofore unobtainable — particularly with respect to large trailer trucks, as previously mentioned.

The present liquid-level-indicating device comprises a bell housing defining a pressure chamber disposed within a fuel tank or an enclosed container, the bell housing being positioned adjacent the bottom wall or area of the tank. Thus, the liquid fuel stored therein is capable of covering the lower portion of the chamber which is adapted with a regulating plug having at least one orifice disposed therein to allow free flow of air and liquid therethrough, so as to provide a constant pressure within the chamber and throughout the conduit system which is attached at one end to the upper wall of the chamber, the opposite end thereof being secured to a pressure-actuated gauge means. Hence, the pressure within the chamber of the bell housing is transmitted through the conduit system which allows the gauge means to be positioned in any desired location, preferably a location on or with respect to the instrument panel, so as to be readily visible at all times to the driver of the vehicle.

Included within the operation of the present invention, there is provided a pressure-charging means which directly communicates with the pressure chamber. This permits the chamber to be purged of the liquid fuel — thus providing a true reading on the gauge as to the accurate pressure within the chamber.

Included herein are two alternative arrangements of the present invention, using the same principles as herein set forth.

One of said arrangements is a pressure chamber defined by a housing positioned on the outer of a container, and being removably secured to the side wall adjacent the bottom wall thereof, with the lower outlet opening terminating within the container or tank, whereby the pressure within the housing chamber is affected by the pressure provided by the liquid fuel disposed within the tank. The chamber opening is adapted to receive a pressure-regulating plug having at least two openings to provide regulating outflow and inflow of liquid and air therethrough.

The second alternative arrangement is attached directly to the bottom wall of said tank, and has a bell housing forming a chamber and means therein to allow equalization of pressure between the housing chamber and the chamber within the tank.

OBJECTIVES AND ADVANTAGES

The present invention has for an important object a provision wherein the operation thereof is completely controlled by the variation of pressure within the chamber of the bell housing.

It is another object of the invention to provide a liquid-level-indicating device that operates automatically due to pressure response within the pressure system, the pressure response being affected by the level of liquid disposed within the tank.

It is further another object of the present invention to provide a liquid-level-indicating device wherein no mechanical moving parts such as floats and mechanical linkages are required, thus providing a greatly improved and reliable operation.

It is a further object of the invention to provide an indicating device of the character described which can be installed within existing tanks on truck trailers and the like, without any change or dismantling of the standard tank, and wherein conventional tools can be applied thereto.

A still further object of the invention is to provide a liquid-level-indicating device that is adapted with a positive charging means whereby a true air pressure can be maintained under all adverse conditions, so that a constant accurate reading can be readily obtained from the pressure-sensitive gauge.

It is another object of the invention to provide an indicator of this character having a means for trapping a body of air in a liquid container so that the liquid acts upon the trapped body of air, and thus transmits the exerted pressure to a remotely-located indicating device or gauge, which designates a true reading in terms of the quantity of fluid disposed in the container.

It is still another object of the present invention to provide a liquid-level-indicating device of the character herein described which is very simple to install within a vehicle fuel system, and wherein the device has no moving parts and is rugged in construction.

It is a further object of the invention to provide a level indicator of this character that is easy to service and maintain, and has a more dependable and durable life not obtainable heretofore with other devices.

Other characteristics, advantages and objectives of this invention can be more readily appreciated from the following description and appended claims. When taken in conjunction with the accompanying drawings, this description forms a part of the specification wherein like references and characters designate corresponding parts in several views.

DESCRIPTION OF THE DRAWINGS

Referring more particularly to the accompanying drawings, which are for illustrative purposes only, FIG. 1 is a diagrammatic view illustrating the present invention operably supported within a fuel tank, with a gauge and charger means remotely secured thereto;

FIG. 2 is an enlarged partially-sectioned view of the device as it is secured within the tank, as indicated in FIG. 1;

FIG. 3 is a cross-sectional view taken substantially along line 3—3 of FIG. 2;

FIG. 4 is an enlarged cross-sectional view of the charger means;

FIG. 5 is a cross-sectional view of the lower portion of the pressure chamber having an alternative regulating plug;

FIG. 6 is a diagrammatic illustration of an alternative arrangement of the present invention, wherein the pressure-sensitive housing unit is positioned externally of the fuel tank;

FIG. 7 is an enlarged cross-sectional view of the pressure-sensitive housing as shown in FIG. 6;

FIG. 8 is an enlarged cross-sectional view taken along line 8—8 of FIG. 7;

FIG. 9 is an enlarged cross-sectional view of still another arrangement of the present invention; and FIG. 10 is a cross-sectional view taken along line 10—10 of FIG. 9.

DESCRIPTION OF THE PREFERRED EMBODIMENT

Referring more particularly to the drawings and specifically to FIG. 1, there is shown a tank or container, generally indicated at 10, having stored therein a liquid fuel 12 such as gasoline or diesel oil, said tank being of the type normally found affixed to truck trailers and like vehicles. The tank is provided with an inlet spout 14 of any well known design, whereby the fuel is deposited within the tank 10.

Once the fuel is disposed within the fuel tank, it is necessary for an operator of the vehicle to be provided with a very accurate reading of the amount of fuel in the tank at all times. Since tanks generally carry as much as fifty gallons of fuel, the vehicles can haul items over long distances with very few fuel stops. Thus, a truck operator must have an accurate reading at all times.

Accordingly, the present invention comprises a liquid-level-indicating device, generally indicated at 16, having a mounting head 18 removably secured to the upper tank wall 20. The wall is provided with an opening 22 adapted to receive head 18, said head being formed with an annular enlarged flange 24 which is affixed to the tank wall by fastening means illustrated as screws 26 (See FIG. 2.). Disposed between the flange 24 of the head 22 and the wall 20 is a radial seal 27 for preventing fuel leakage or evaporation from the fuel storage container 10.

Threadably secured to the depending side of the support mounting head 18 is an elongated, depending, tubular pipe 28, which is provided at both of its ends with external threads 29. Thus, one end of the pipe 28 is threaded into the enlarged threaded bore 30 of head 18. The opposite end of said pipe is threadably received within the upper end wall 32 of the bell housing, indicated generally at 34, said end wall 32 having an opening disposed therein to receive said pipe 28.

The bell housing 34 provides a means for trapping a body of air in the liquid container 10 so that the liquid 12 disposed therein acts upon the trapped body of air, and thus transmits an exerted pressure to a remotely-located indicating device or gauge, as seen in FIG. 1 and generally indicated at 36. Said bell housing comprises a tubular body 37 depending from its upper wall 32 and terminating at its lower end with an opening 38, said opening being adapted to receive a pressure-control means, indicated generally at 40.

The pressure-control means 40 comprises a plug head 42, said head being formed with a central, truncated, cone-shaped body which includes a centrally-disposed first orifice 43 and a second orifice 44 positioned along the lower enlarged portion of said truncated body or head 42, said second orifice 44 being slightly larger than said first orifice 43. Thus, outflow and inflow of both air and fluid can be accommodated within the pressure chamber 45, said chamber being defined by tubular body 37, wall 32 and plug head 42.

It should be noted at this time that the bell housing is so positioned that the pressure-control means 40 is disposed adjacent to — but not in contact with — the lower wall portion 46 of tank 10. As can be seen in FIG. 2, distance indicated by A will vary from tank to tank so that, when the tank is round as illustrated in FIG. 1, diesel fuel is generally used therein; hence, it has been found that the distance A should be approximately 1-½ to 1 inch. However, when the tank or container is designed in a flat configuration, the position of bell housing 34 should be approximately ½ inch from the bottom of the tank.

The above-described positions for the bell housing provide not only a maximum efficient operating condition but also allow for a fuel reserve when the gauge reads empty.

Accordingly, as the pressure within the chamber 45 is created by the amount of fuel received within the tank 10, the pressure is transmitted therefrom through piep 28 and into a multi-connection pipe unit, shown as a T-joint connection 47. This connection is threadably received in the reduced-diameter bore 48 of the mounting head 18, thus allowing free flow of air pressure through bores 49 and 50 of the "T" joint. The upper end of bore 49 is plugged by means of plug 52 and cap 54, thereby preventing pressure from passing therethrough. Bore 50 communicates with bore 49 at right angles thereto, allowing the air pressure to reach gauge 36 through a flexible conduit 56 which is secured at one end by a securing nut 58 to T-joint 47, the opposite end of conduit 56 being secured to the remote gauge 36.

Now that it can be understood how the air pressure reaches the gauge from chamber 45, it should be noted that as the fluid is pumped into tank 10 the ambient air therein is forced into chamber 45 by means of the two orifices 43 and 44.

Accordingly, as the gasoline or other fuel fills the tank, the various levels in the amount of liquid therein will cause a corresponding variation of pressure in the pressure chamber 45 — thus, instantly transferring the affected pressure through the pressure-conduit system, whereupon an instantaneous and accurate corresponding variation is indicated on the gauge 36.

As the liquid first reaches the orifice 44, orifice 43 allows the air trapped above orifice 44 to freely enter chamber 45.

Thus, it has been found that when loss of liquid from the bell chamber occurs because of any abrupt stopping or uneven movement of the vehicle, the frustoconical-shaped plug together with both orifices 43 and 44 trap air therein to maintain an equal balance of pressure at all times.

However, there are times when ambient outside weather conditions, such as very hot weather or very cold weather, will affect various parts of the pressure system, including the gauge. Thus, if too much liquid enters chambers 45 due to a reduced pressure therein, a false reading will occur; and, inversely, if the pressure is so great therein as to force the liquid out of the chamber, the reading will be inaccurate.

Hence, the present invention includes a charger means, indicated generally at 60, which permits air to be pumped directly into the chamber 45, thus correcting any of the above-described false readings. It is contemplated that said charger means be located remotely from the tank, preferably adjacent the gauge 36 as seen in FIG. 1, whereby the operator can charge the system whenever he feels the need to do so.

There are various chargers that can be used in this operation, and one such device is shown in detail in FIG. 4. This charger means comprises a pump casing 62 which is adapted to be slidably mounted to a stationary pump, generally indicated at 64. Said plunger includes a plunger head 66 forming a pump chamber 67 within pump casing 62, said casing 62 being adapted with a cap 68 through which the plunger stem 70 passes. The stem 70 is provided with communicating passage 72 to which a flexible conduit 74 is attached. Various means for attaching the charger to the display panel 75 can be used; however, this device includes a radial flange 73 located on the lower end of stem 70 so as to be fitted against panel 75 when screwed therein by the enlarged threaded member 76. An additional locking nut may be included as indicated at 77.

Accordingly, as pump casing 62 is pushed downward over pump plunger 64, the air hole 78 is covered and air pressure is forced from chamber 67 through passage 72, forcing check valve 80 to open — allowing air pressure to flow into conduit 74 and discharge into the lower end of bell chamber 45, as shown in FIG. 2. The conduit 74 is also sealed within the pressure system by plug 54 in T-joint 46. Check valve 80 is a one-way valve and, therefore, pressure from within the system can not return to the charger means 60.

Referring to FIG. 5, there is shown an alternative arrangement of the pressure control means as indicated generally at 82. Said control means 82 is formed in a somewhat parabolic configuration, wherein the dome thereof is provided with an orifice 84 similar to orifice 43 and a second enlarged orifice 86 relative to orifice 44 of plug head 42. Hence, this alternative arrangement operates in a similar manner to that of head 42.

ALTERNATIVE EMBODIMENT

Referring now to FIG. 6, there is shown as alternative embodiment of the present invention, wherein the pressure bell housing, generally indicated at 88, is secured to the lower outer wall 89 of a rectangular tank or container 90. Said housing 88 comprises side wall 92, an upper end wall 94, and a lower end wall 96. The upper end wall is adapted to receive fitting 97 in a threaded opening 98, wherein a flexible conduit 99 is secured thereto and extends to a remotely-disposed gauge 100.

There is defined within the housing 88 a pressure chamber 102 operating in the same manner as chamber 45 of housing 34. However, since housing 88 is positioned on the outer side of the tank 90, there is provided on the lower portion of housing 88 an extending neck member 104 having a reduced-diameter threaded member 105. Said member 105 is threaded into opening 106 of wall 89 just above the bottom tank wall 107. Neck member 104 and its threaded member 105 is adapted with a passage 108 in which a pressure-control means is disposed. This particular control means comprises a plug 110 formed to fit passage 108 and is provided with a pair of grooves 111 and 112, the lower groove 112 being the larger of the two (See FIG. 8.).

This embodiment also includes a charger means such as heretofore described, said charger being indicated at 114 in FIG. 6. The charger 114 is operably connected to chamber 102 by means of conduit 115 which is adapted with a connection fitting 116. Said fitting is secured to wall 96 of housing 88 and communicates therein to chamber 102, thus providing the necessary means to correct any possible inaccurate readings of the pressure gauge 100, as previously described.

There is also illustrated in FIGS. 9 and 10 a second alternative arrangement, wherein the bell housing 117 is located within the wall of tank 10 and is removably secured to the bottom wall 46. Fixedly attached to the inner side of wall 46 is a mounting head 118 having a threaded opening 119 through which housing 117 passes and is secured therein by support base member 120 of the housing 117. The base member 120 is provided with a bore 121 in which a pressure-conduit tube 122 is fixedly supported, so as to position said tube within pressure chamber 124 defined by housing 117. Thus, pressure created by the liquid fuel passing through holes 125 and 126 into chamber 124 is allowed to be transferred to the gauge by means of tube 122 which communicates with the flexible tube 128. The flexible tube 128 is removably attached to base member 120 by means of fitting 130.

The invention and its attendant advantages will be understood from the foregoing description and it will be apparent that various changes may be made in the form, construction and arrangement of parts of the invention without departing from the spirit and scope thereof or sacrificing its material advantages, the arrangement hereinbefore described being merely by way of example, and I do not wish to be restricted to the specific forms shown or uses mentioned, except as defined in the accompanying claims.

I claim:

1. An apparatus for indicating an accurate level of liquid disposed within a tank, said tank being of the type for storage of liquid fuel and adapted to be mounted to a motor vehicle, wherein said apparatus comprises:

a bell housing being in operable communicating relationship with the interior of said tank;

a pressure chamber defined by said bell housing;

a pressure-control means positioned adjacent the lower end of said bell housing, whereby air and liquid can pass between said chamber and said tank, said pressure-control means including:

a first orifice;

a second orifice, said first orifice having a reduced diameter relative to that of said second orifice, and wherein said first orifice is positioned above said second orifice;

a pressure-gauge means operably interconnected to said pressure chamber, whereby a constant reading of the liquid contents of said tank can be obtained; and a conduit system disposed between said pressure-gauge means and said pressure chamber, whereby said pressure-gauge means is remotely disposed with respect to said tank.

2. An apparatus for indicating an accurate level of liquid in a tank, as recited in claim 1, including a pressure-charging means which directly communicates with said pressure chamber.

3. An apparatus for indicating an accurate level of liquid in a tank, as recited in claim 2, wherein said bell housing is positioned adjacent the bottom of said tank; wherein the bell housing is provided with a lower opened end; and wherein said pressure-control means comprises a pressure-regulating plug adapted to be received in said lower opened end of said housing, said plug being provided with said first and second orifices disposed therein to provide regulating outflow and inflow of liquid and air therethrough.

4. An apparatus for indicating an accurate level of liquid in a tank, as recited in claim 3, wherein said bell housing is disposed within said tank and wherein said pressure-regulating plug comprises a plug head being formed with a central, truncated, cone-shaped body which includes said first orifice being disposed in the upper truncated portion thereof, and said second orifice being positioned along the lower enlarged portion of said cone-shaped body, whereby outflow and inflow of air and liquid can be regulated within said chamber.

5. An apparatus for indicating an accurate level of liquid in a tank, as recited in claim 3, wherein said bell housing is disposed within said tank and wherein said pressure-regulating plug comprises a plug head having a substantially parabolic configuration, said first and second orifices being disposed therein.

6. An apparatus for indicating an accurate level of liquid in a tank, as recited in claim 4 said conduit system comprising:

a mounting head secured to said tank;

a multi-connection pipe unit secured to said mounting head;

a flexible conduit connected at one end to said multi-connection pipe unit and the opposite end thereof being connected to said gauge means;

an enlarged elongated pipe secured at one end to said mounting head and depending therefrom within said tank, the opposite end of said pipe being secured to said bell housing and directly communicating with said chamber, whereby said pressure within said chamber is transmitted to said gauge means.

7. An apparatus for indicating an accurate level of liquid in a tank, as recited in claim 6 wherein said remotely-disposed charger means includes a flexible conduit attached at one end to said charger means, and the opposite end thereof terminating within said pressure chamber adjacent said plug head and within said conduit.

8. An apparatus for indicating an accurate level of liquid in a tank, as recited in claim 3, wherein said bell housing is secured to the exterior of said tank, the lower open end of said bell housing communicating with the liquid disposed within said tank; and wherein said pressure-regulating plug comprises a plug head adapted to be received within said open lower end of said bell housing having upper and lower grooves disposed along the length thereof, whereby the air and liquid communicates between said tank and said pressure chamber, the upper groove having a reduced width relative to that of the lower groove.

9. An apparatus for indicating an accurate level of liquid in a tank, as recited in claim 4, wherein said bell housing is positioned within the tank thereof and includes:

a mounting head for removably securing said housing adjacent the lower portion of said tank, said mounting head having a central reduced-diameter bore and an enlarged-diameter bore therein for communication therethrough;

a pressure-conduit tube fixedly disposed in said reduced-diameter bore and extending upwardly within said pressure chamber; and a fitting received in said enlarged bore whereby said conduit system is removably secured to said mounting head.

* * * * *